Figure 4:
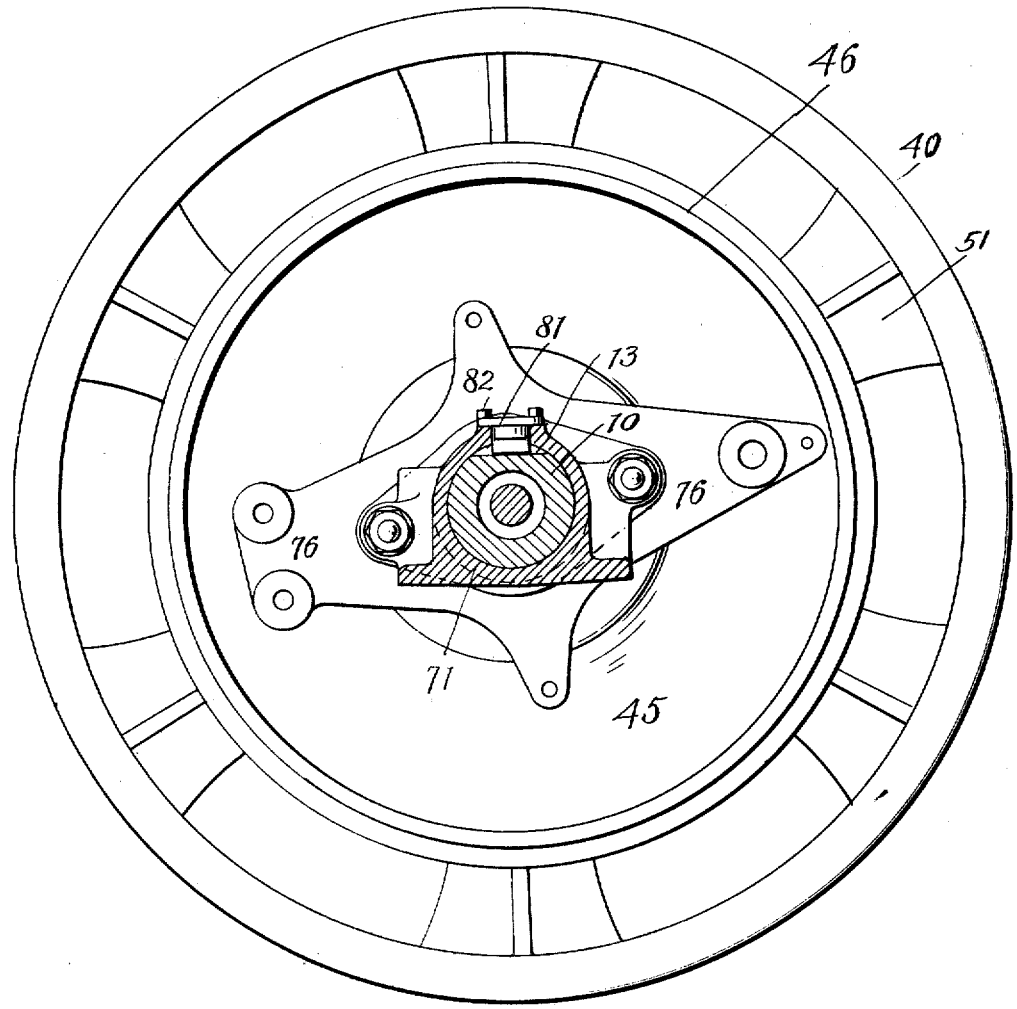

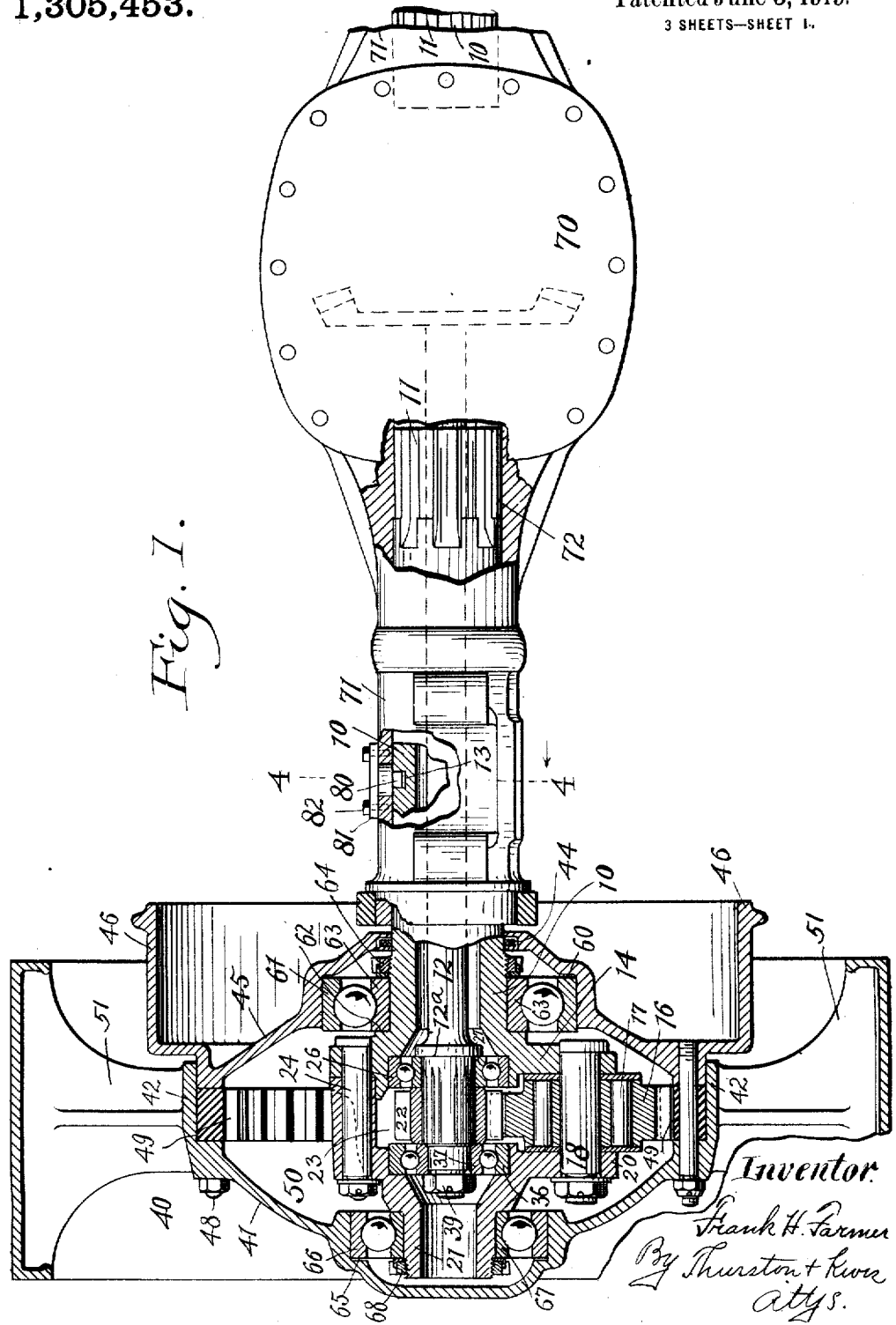

F. H. FARMER.
INTERNAL DRIVE REAR AXLE FOR MOTOR TRUCKS.
APPLICATION FILED JAN. 11, 1918.
1,305,453.
Patented June 3, 1919.
3 SHEETS—SHEET 2.
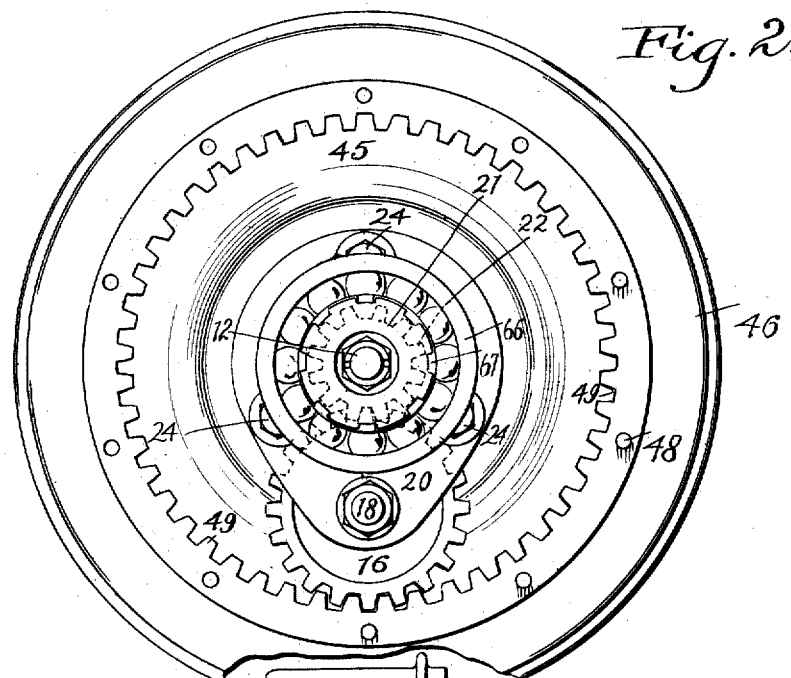
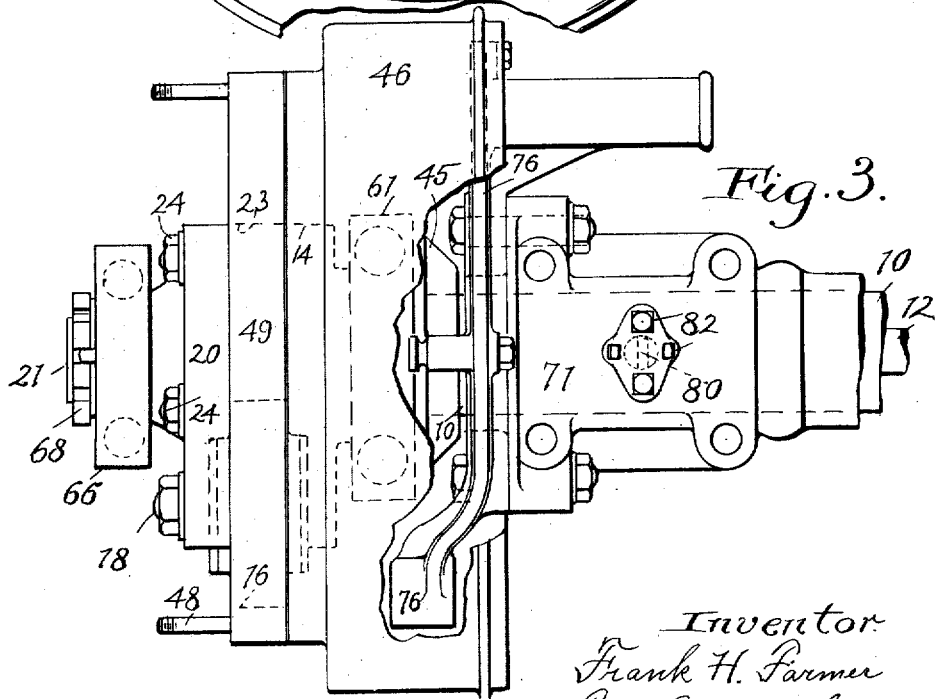
Inventor
Frank H. Farmer
By Thurston & Rivus
attys.

UNITED STATES PATENT OFFICE.

FRANK H. FARMER, OF CLEVELAND, OHIO, ASSIGNOR TO THE WHITE MOTOR COMPANY, OF CLEVELAND, OHIO, A CORPORATION OF OHIO.

INTERNAL-DRIVE REAR AXLE FOR MOTOR-TRUCKS.

1,305,453.  Specification of Letters Patent.  Patented June 3, 1919.

Application filed January 11, 1918. Serial No. 211,447.

*To all whom it may concern:*

Be it known that I, FRANK H. FARMER, a citizen of the United States, residing at Cleveland, in the county of Cuyahoga and State of Ohio, have invented a certain new and useful Improvement in Internal-Drive Rear Axles for Motor-Trucks, of which the following is a full, clear, and exact description.

This invention relates to what are known in the trade as internal drive rear driving axles, such as are particularly adapted for use on heavy powerful motor trucks. Such rear axles include a hollow frame member which has a central enlargement constituting the housing in which the differential mechanism is suitably mounted, and two axle tubes which extend in opposite directions from said central housing, and have traction wheels rotatably mounted upon them. Live axle sections, which are driven differentially by the differential gearing in the housing, extend outward through these axle tubes; and reducing gearing is provided for transmitting motion from said two axle shafts respectively to the two traction wheels.

The present invention relates, in part, to the construction of the hollow axle frame member. It includes means whereby said frame member is adapted to perform its functions and to resist and remain operative under the enormous stresses to which it is subjected in practical use; but which nevertheless permits said frame member to be of minimum weight for its strength, and to be readily assembled and disassembled when desired.

The invention also relates to the traction wheels and the reducing gearing which they inclose, and by which they are driven; and to the means for mounting said wheels and gearing, to the end that the coöperating parts shall be strong, durable and efficient, and to the end also that the wheel may be readily dismounted when that is desirable for any reason, as for example, to enable one to put on a tire, or to inspect and repair the wheel and the inclosed mechanism.

In the drawings, Figure 1 is a rear elevation partly sectioned of rather more than one half of a rear axle, which embodies the invention; that is to say, this view shows the central differential housing and the mechanism on the left side thereof. It is to be understood, however, that all of the mechanism shown as on the left side of this differential housing is duplicated on the right side thereof to form the complete axle. Fig. 2 is a left end view of the axle when the wheel has been removed therefrom. Fig. 3 is a plan view of the left end of the axle, when said wheel has been removed therefrom, and with a part of the brake drum broken away; and Fig. 4 is a transverse sectional view in the plane indicated by line 4—4 on Fig. 1.

The axle includes a hollow axle frame member which consists of three main parts, viz.: the middle part and two ends. The middle part includes the differential housing 70 and two tubes 71 which extend therefrom laterally in opposite directions. Each end member consists of a tube 10 which carries a gear cage on its outer end.

Each tube 10 is telescoped into a tube 71 in which it fits nicely, and with which there is a tongue and groove connection which prevents relative rotary motion. Specifically, the inner tube near its inner end is formed with longitudinal splines and grooves 11 which engage and interlock with complementary longitudinal splines and grooves 72 on the inner face of the outer tube 71. The position of each of these telescoping tubes 10 lengthwise within tube 71 is determined by a key piece 80 which goes through a hole in the outer tube and fits a hole 13 in the inner tube. This key-piece has a flange 81 on its outer end which rests upon the outer tube and is secured thereto by cap screws 82 or the like. When the three parts of the hollow axle frame member are assembled and connected as stated, said frame member constitutes a strong, rigid structure. But it may be easily taken apart and repaired if any part chances to break, or if for any reason repairing is desirable.

As stated, each inner tube 10 carries in its outer end a gear cage. One part 14 of said gear cage is integral with the tube. The other part 20 of said cage is a plate which is secured to the part 14 in parallel relation thereto. This plate 20 is formed with a spacing flange 23 which, by engaging the part 14 determines the position of the plate 20 with respect thereto. Bolts 24 rigidly secure the plate 20 to the part 14, thereby forming the complete gear cage. The plate 20 has, however, an outwardly extended cylindrical boss 21 which is concentric with the tube 10, the purpose of which will be presently described.

An axle shaft 12 extends from the differential housing 70 outward through each of the tubes 10 into the gear cage. A pinion 22 is permanently fixed to this axle shaft within the gear cage. The axle shaft is rotatably supported upon the gear cage by means of two anti-friction ring bearings located respectively on opposite sides of said pinion. The inner ring 27 of one ring bearing is fitted on the shaft 12 in contact with a flange 12ª thereon, while the outer ring 26 of said bearing is fitted within a cylindrical recess in the outer face of the part 14. The outer ring 36 of the other ring bearing is fitted in a concentric cylindrical recess in the inner face of the plate 20, while the inner ring 37 of the bearing is fitted upon a cylindrical part of the axle shaft 12. A nut 39 which screws onto the extreme end of this axle shaft pushes the inner ring bearing 37 against the hub of the pinion 22 and pushes this hub against the inner ring 27 and thereby holds all of these parts in the proper relationship as shown.

The wheel as shown is formed of two pieces. The center of the wheel is formed of two oppositely dished plates 41, 45, which, when connected together form an oil and dust-proof chamber in which the reducing gearing which has been explained is housed, and by which it is protected. The plate 41 has a cylindrical flange 42 at its margin, which is concentric with the wheel. The spokes 51 are integral with and project outwardly from this flanged plate 41, and the rim 52 is integral with the spokes. The inner plate 45 has an axial hole through which tube 10 passes, and it is cylindrical at its margin, and fitted into the cylindrical flange 42. The brake drum 46 is formed integral with plate 45. An internal ring gear 49 is fitted into the flange 42 between plates 41 and 45 and these two parts are connected together by cap screws 48 or the like.

The plate 45 is rotatably mounted on tube 10 by means of an annular ball bearing which, *per se*, is of familiar form. The inner ring 63 of said bearing is secured on tube 10 between a shoulder 62 thereon and a nut 64 which screws onto said tube. The outer ring 61 of said bearing is nicely fitted into a cylindrical recess 60 in the inner face of plate 45. A washer 44 of felt or the like is fitted into a groove in the circular wall of the hole in plate 45, through which the tube passes, so as to have a sliding engagement with said tube and form an oil and dust tight joint. The outer plate 41 of the wheel is likewise rotatably supported by an anti-friction ring bearing upon the cylindrical stud 21 of the gear cage. The outer ring 66 of this bearing is nicely fitted into the cylindrical recess 65 in the inner face of the plate 41, while the inner ring 67 of said bearing is fitted upon the stud 21 and is held thereon against a shoulder by the nut 68 which screws upon said stud.

From the foregoing it is apparent that the complete wheel is rotatably supported by the hollow axle frame member by means of anti-friction ring bearings placed in widely separated positions so as to render said bearings most effective.

An idler gear 16 which is rotatably mounted in the gear cage on stud 18 with the intermediately placed anti-friction rollers 17, meshes with pinion 22 and with the internal ring gear 49. Therefore as the axle shaft 12 is rotated by the differential gearing in the axle housing 70 the wheel will be rotated but at a very much reduced speed.

Each tube 71 is formed adjacent its outer end with two integral bracket arms 76. The brake supporting bracket goes over the outer end of tube 71, and is secured rigidly to the bracket arms by screws or bolts. Any suitable brake and brake operating mechanism may be mounted on the brake supporting bracket. Since the brake mechanism is carried by the outer tubes 71, the application of the brake does not apply to the structure any strain tending to turn the inner tube within the outer tube. The described means for supporting the brake mechanism has been made the subject of another application, Serial No. 289856, filed April 14, 1919.

When for any reason it is desired to remove the wheel it is only necessary to unscrew the cap screws 48, whereupon said wheel and internal ring gear may be withdrawn. This leaves plate 45 with its brake drum 46 in the position shown, and leaves the annular ball still rotatably mounted upon the axle tube; this enables one to get at and inspect and repair any of the mechanism which is normally inclosed within the hollow chamber 50 in the wheel. Heavy truck wheels generally have applied to them solid tires for the application of which it is necessary to employ a ponderous machine into which the wheel must be placed. In other words, it is desirable to remove the wheel from the vehicle in order that such tires may be applied. The facility with which the wheels described may be so removed is a very desirable feature.

Having described my invention, I claim:—

1. In a driving axle for a motor truck, the combination of a hollow axle frame member having a centrally placed differential housing and two alined tubes which project therefrom in opposite directions, and associated with each of the last named tubes, a tube which telescopes into the same and has a longitudinal tongue and groove connection therewith, and a key which passes through the outer tube and is secured externally thereto and engages the inner tube to fix the position of said tubes longitudinally with respect to one another.

2. In a driving axle for a motor truck, the combination of a non-rotatable axle tube, a gear cage fixedly carried by the outer end of said axle tube and having an outwardly extended concentric stud, a rotatable axle shaft extending out through said axle tube and into said gear cage, a pinion fixed to said axle shaft within said gear cage, annular ball bearings by which said axle shaft is supported by the gear cage on both sides of said pinion, an idler gear mounted in said gear cage in mesh with said pinion, a traction wheel formed with a dished outer plate having at its outer margin an annular cylindrical flange and outside of that the outer portion of a wheel, and an oppositely dished inner plate which fits within said cylindrical flange, an internal ring gear which also fits within said cylindrical flange between said dished plates, means to firmly secure together said ring gear and two plates, an annular ball bearing located within the central chamber within the wheel by means of which the inner dished plate is mounted on said axle tube, and a second annular ball bearing located within said chamber by means of which the outer dished plate of the wheel is rotatably mounted on the outwardly extended cylindrical stud which is a part of the gear cage.

3. In a driving axle for a motor truck, the combination of a non-rotatable axle tube, a gear cage fixed to the outer end of said axle tube and having on its outer side an outwardly projecting concentric cylindrical stud, a rotatable axle shaft extending out through said axle tube and into said gear cage, a pinion fixed to said axle shaft within said gear cage, anti-friction ring bearings supported by said gear cage and applied to said axle shaft on opposite sides of the pinion thereon, an idler gear mounted in said gear cage in mesh with said pinion, a traction wheel whose center part is formed by two oppositely dished plates which are separably secured together near their margin, one of said plates being rotatably supported by anti-friction bearings upon said axle tube inside of the gear cage and the other being rotatably supported by means of anti-friction bearings by the cylindrical stud on the outer end of said gear cage, one of said plates being provided at its outer margin with a cylindrical flange and having wheel spokes and a wheel rim integral with said flange and the other of said plates being fitted into said cylindrical flange, a ring gear which is also fitted in said cylindrical flange between said plates, and means to firmly secure together said ring gear and two plates.

4. In a driving axle for a motor truck, the combination of a hollow axle frame member having a centrally placed differential housing and two alined tubes which respectively project from said housing in opposite directions, and, associated with each of said tubes, an inner tube which telescopes into the same and is rigidly fixed thereto and which has at its outer end a rigidly connected gear cage whose outer plate is provided with an outwardly extended concentric cylindrical stud, each outer tube being provided near its end with a bracket arm, a brake supporting bracket which embraces said outer tube and is secured by screws or bolts to said arm, a traction wheel whose middle part is composed of two oppositely dished plates which are secured together near their margins, the outer of said dished plates being formed with a cylindrical flange at its margin and being also formed with integral spokes and rim, the inside plate of said tube being rotatably mounted upon that part of the inner telescoping tube which lies between said gear cage and outer telescoping tube, which inner plate is of cylindrical form at its periphery and fitted into the cylindrical flange of the outside plate and has a brake drum formed integrally thereon near its margin, an internal ring gear also fitted within said cylindrical flange between the two plates, bolts or screws for securing together said two plates and interposed ring gear, an anti-friction ring bearing located within the space inclosed by the two dished plates, which ring bearing is supported on the outwardly projecting stud carried by the gear cage and supports the outer dished plate, an axle shaft which projects out through the axle tube into the gear cage, anti-friction ring bearings by means of which said axle shaft is rotatably supported by said gear cage on opposite sides of said pinion, and an idler gear rotatably mounted in said gear cage in mesh with said pinion and with said ring gear.

5. In a driving axle for a motor truck, the combination of a built up hollow frame member having a differential housing and two axle tubes which extend in opposite directions therefrom, a gear cage which is rigidly connected with the outer end of each axle tube and has an outwardly projecting concentric cylindrical stud and the following mechanism associated with each end of said hollow axle frame member, to-wit: a traction wheel whose middle part is formed of two oppositely dished plates which are connected together to form a central chamber and which are formed each with a concentric cylindrical recess in its inner face, an annular ball bearing of which the inner ring is fixed upon the axle tube inside of the gear cage and the outer ring is fitted in said annular recess in the inner plate, an annular ball bearing of which the outer ring is slidably fitted into the cylindrical recess of the outside plate and the inner ring is fixed upon the gear cage stud, an axle shaft which extends through the axle tube from the differential housing into the gear cage, a pinion fixed to said shaft within said gear cage, two annular ball bearings interposed respectively between said gear cage and axle shaft on both sides of said pinion, a concentric internal ring gear secured to the said wheel within the central chamber thereof, and an idler gear mounted on said gear cage in mesh with said pinion and ring gear.

6. In a driving axle for a motor truck, the combination of a non-rotatable axle tube, a gear cage fixedly carried by the outer end of said axle tube and having an outwardly extended concentric cylindical stud, a rotatable axle shaft extending out through said axle tube and into said gear cage, a pinion fixed to said axle shaft within said gear cage, two annular ball bearings by which said axle shaft is supported by the gear cage on both sides of said pinion, an idler gear mounted in said gear cage in mesh with said pinion, a traction wheel whose central portion is formed of an outside dished plate having at its outer margin an annular cylindrical flange and outside of that the outer portion of a wheel, and an oppositely dished inner plate which fits within said cylindrical flange, an internal ring gear which fits within said cylindrical flange between said dished plates, means to firmly secure together said ring gear and two plates, an annular ball bearing whose outer ring is slidably fitted into an annular internal recess in the inside plate and whose inner ring is fixed upon said axle tube, and a second annular ball bearing whose outer ring is slidably fitted into a cylindrical recess in the inner face of the outer dished plate and whose inner ring is fixed upon the cylindrical stud which is a part of the gear cage.

7. In a driving axle for a motor truck, the combination with the non-rotatable axle tube, a gear cage which is fixed to the outer end thereof and has an outwardly extended co-axial stud, a wheel whose central portion is formed of two oppositely dished plates, of which the outer plate is formed with a marginal cylindrical flange, and with wheel spokes which extend outward from said flange, the inner of said dished plates being fitted into said cylindrical flange, which two plates are connected together to form a central chamber within the wheel, two annular ball bearings within the central chamber formed by said dished plates, one of which is supported on the axle tube and supports the inside dished plate and the other of which is supported on said stud and supports the outside dished plate, an axle shaft extending through said axle tube into the chamber within said wheel, and means withing said chamber for transmitting motion from said axle shaft to said wheel.

8. In a driving axle for a motor truck, the combination of a built-up hollow frame member having a differential housing, two axle tubes which extend in opposite directions therefrom, and a gear cage which is rigidly connected with the outer end of each axle tube and has an outwardly projecting co-axial cylindrical stud, with the following mechanism associated with each end of said hollow axle frame member, to wit, a traction wheel whose middle part is formed of two oppositely dished plates which are connected together to form a central chamber and which are formed each with a concentric cylindrical recess in its inner face, an annular ball bearing, of which the inner ring is fixed upon the axle tube inside of the gear cage and the outer ring is fitted in said annular recess in the inner plate, an annular ball bearing of which the outer ring is slidably fitted in the cylindrical recess of the outside plate, and the inner ring is fixed upon the gear cage stud,—the outer of said dished plates being formed at its margin with a cylindrical flange and with spokes extending outward from said flange, and the inner of said dished plates being fitted within said cylindrical flange, a ring gear which is also fitted within said cylindrical flange between the two dished plates, means connecting together said two dished plates and ring gear, an axle shaft which extends through said axle tube, and gearing within said central chamber for transmitting motion from said axle shaft to said traction wheel.

In testimony whereof, I hereunto affix my signature.

FRANK H. FARMER.

Witnesses:
H. CROWELL PEPPER,
FANNIE F. PHILLIPS.

Copies of this patent may be obtained for five cents each, by addressing the "Commissioner of Patents, Washington, D. C."